United States Patent [19]

Stuller et al.

[11] Patent Number: 5,542,790
[45] Date of Patent: Aug. 6, 1996

[54] MODULE DISPERSER

[75] Inventors: Howard E. Stuller; Stephen E. Stuller; Timothy A. Compton, all of Lubbock, Tex.

[73] Assignee: Industrial Business Consultants, Inc, Lubbock, Tex.

[21] Appl. No.: 392,521

[22] Filed: Feb. 23, 1995

[51] Int. Cl.[6] .................................................. B65G 53/14
[52] U.S. Cl. .......................................... 406/116; 406/152
[58] Field of Search .................................. 406/115, 116, 406/151, 152, 153

[56] References Cited

U.S. PATENT DOCUMENTS

| | | | |
|---|---|---|---|
| 2,446,573 | 8/1948 | Cameron | 406/152 |
| 2,769,671 | 11/1956 | Muniz | 406/151 |
| 3,262,742 | 7/1966 | Sipe et al. | 406/116 |
| 3,285,671 | 11/1966 | Moreno | 406/151 |
| 3,298,747 | 1/1967 | Beckett et al. | 406/152 |
| 4,195,954 | 4/1980 | Bentzen-Bilkvist et al. | 406/152 |
| 4,352,608 | 10/1982 | Stuller et al. | 406/116 |
| 4,413,933 | 11/1983 | Hesse et al. | 406/152 |
| 4,436,457 | 3/1984 | Willingham | 406/116 |
| 4,470,729 | 9/1984 | Fredenburg et al. | 406/116 |
| 5,117,533 | 6/1992 | Stuller | 406/116 |

FOREIGN PATENT DOCUMENTS

| | | | |
|---|---|---|---|
| 92502 | 10/1968 | France | 406/153 |
| 7905169 | 1/1980 | Netherlands | 406/152 |

*Primary Examiner*—Gary C. Hoge
*Attorney, Agent, or Firm*—Wendell Coffee

[57] ABSTRACT

Prongs driven by a hydraulic motor break up packed seed cotton beneath the mouth of a suction pipe.

2 Claims, 2 Drawing Sheets

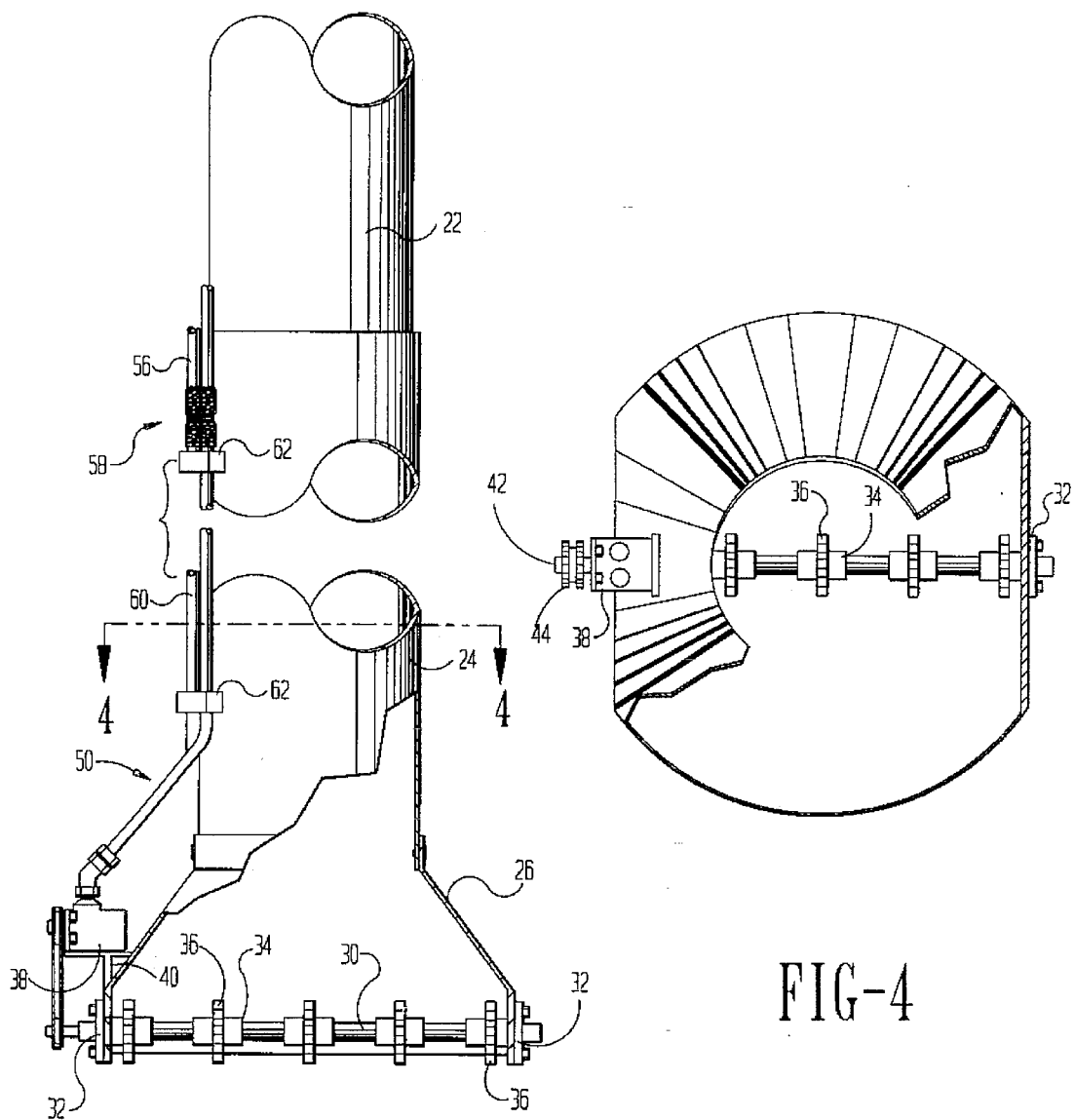

5,542,790

MODULE DISPERSER

BACKGROUND OF THE INVENTION

1. Field of the Invention

This invention relates to cotton gins and more particularly to suction pipes for sucking seed cotton from a compacted module. The cotton from the module is dispersed and pneumatically conveyed into the cotton gin for processing. Cotton gin operators have ordinary skill in the art.

2. Description of the Related Art

Suction pipes for cotton gins are known. An example of a known suction pipe is U. S. Pat. No. 5,117,533 issued to the same assignee as this application is assigned.

At present much of the seed cotton is conveyed to the gin suction as a module. The modules are positioned below the suction pipe and the cotton is sucked from the module by the suction pipe and thereby pneumatically conveyed into the gin.

Previously much of the cotton was conveyed to the gin in wagons or trailers. Although the cotton in a wagon or trailer may have been tromped by people tromping the cotton with their feet at present time modules are made by mechanically compressing the seed cotton tightly into the module so that there is a mass of cotton which is difficult to introduce into the suction pipe. Sometime it is difficult to get the cotton to be picked up by the suction. At other times the suction will pick up a large mass of cotton packed together causing it to form blockage at the mouth of the suction pipe.

Also, according to practice today, often the suction pipes are remotely controlled. The pipe itself is connected to a suction head which is mounted on a carriage which is mounted on a cross frame which moves rectilinearly. That is to say that the head itself can be moved longitudinally and transversely. In addition, the pipe itself can be swung from side to side at different angles from the suction head. The '533 patent referred to above discloses a bell upon the bottom of a suction pipe.

SUMMARY OF THE INVENTION (1) Progressive Contribution to the Art

This application discloses method and structure for dispersing the packed seed cotton in the module by breaking it up so that it is more easily picked up by the suction. Also, the seed cotton is not lifted in large chunks or blocks which block the mouth of the suction pipe.

This breaking up is performed by having prongs which move and disperse the seed cotton below the mouth of the suction pipe. In the preferred embodiment the prongs are attached to a shaft having a horizontal axis which is mounted near the bottom or lower end of the suction pipe. The prongs project lower than the lower end. The preferred power for rotating the shaft is by a hydraulic motor which is mounted immediately above the prong shaft. It is desirable that the motor not extend away from the peripheral boundary of the bell upon the suction pipe. Therefore, it is mounted close to the pipe above the bell to avoid this undesirable projection.

The hydraulic lines or hoses leading to the motor are strapped to the lower outer barrel of the suction pipe. A quick connect coupling at the top of the outer barrel connects the hoses to flexible hoses which extend upward to a hose reel mounted upon the suction head.

Preferably the prongs are mounted on cuffs or discs which are preferably made of urethane. Sometimes metal objects will be imbedded in the mass of seed cotton. Iron prongs or spikes would be undesirable as the possibility of causing a spark either from iron or certain rocks which might be in the cotton.

(2) Objects of this Invention

An object of this invention is to suck packed seed cotton into a cotton gin.

Further objects are to achieve the above with devices that are sturdy, compact, durable, lightweight, simple, safe, efficient, versatile, ecologically compatible, energy conserving, and reliable, yet inexpensive and easy to manufacture, install, operate, and maintain.

Other objects are to achieve the above with a method that is rapid, versatile, ecologically compatible, energy conserving, efficient, and inexpensive, and does not require highly skilled people to install, operate, and maintain.

The specific nature of the invention, as well as other objects, uses, and advantages thereof, will clearly appear from the following description and from the accompanying drawings, the different views of which are not necessarily scale drawings.

BRIEF DESCRIPTION OF THE DRAWINGS

FIG. 3 is a side elevational view with parts broken away to show the prong shaft within the bell.

FIG. 4 is a top plan view taken substantially on line 4—4 of FIG. 3 with portions of the bell broken away to show the prong shaft.

CATALOGUE OF ELEMENTS

Figures 1, 2:
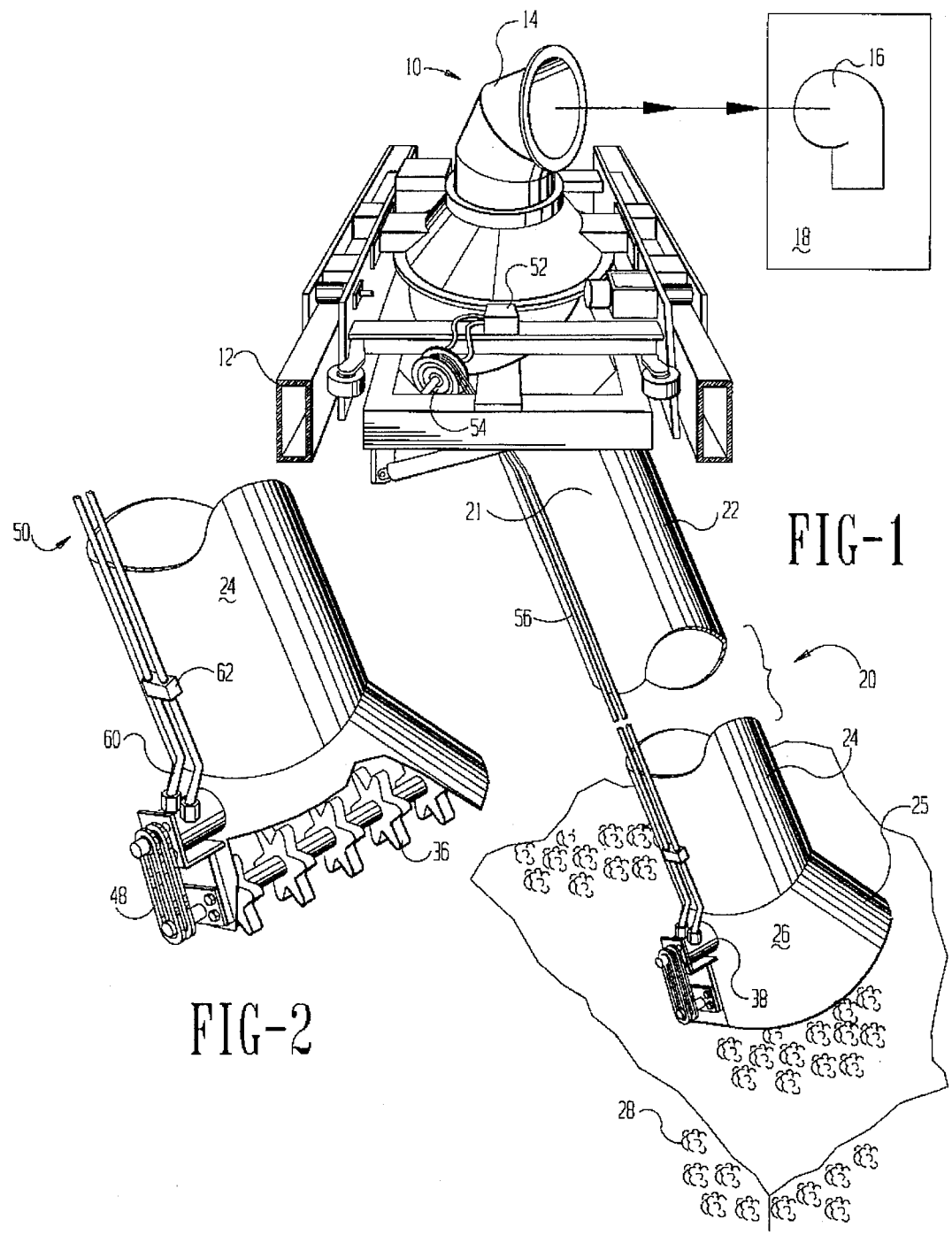
FIG. 1 is perspective view of a suction pipe according to this invention with some parts shown schematically.
FIG. 2 is a detail of the lower end of the suction pipe with parts of the broken away to show the rotating prongs.

As an aid to correlating the terms of the claims to the exemplary drawing(s), the following catalog of elements and steps is provided:

- 10 suction head
- 12 overhead structure
- 14 elbow
- 16 fan
- 18 cotton gin building
- 20 suction pipe
- 21 upper end
- 22 inner barrel
- 24 outer barrel
- 25 lower end
- 26 bell
- 28 packed seed cotton
- 30 horizontal prong shaft
- 32 bearings
- 34 cuffs
- 36 prongs
- 38 hydraulic motor
- 40 bracket
- 42 motor shaft
- 44 motor shaft sprocket
- 48 chain
- 50 hydraulic hoses
- 52 hydraulic fluid under pressure 54 hose reel
56 upper hose portion
58 quick connection
60 lower hose portion
62 connectors

DESCRIPTION OF THE PREFERRED EMBODIMENTS

Referring to the drawings, and particularly FIG. 1, there may be seen suction head 10 which is mounted in overhead structure 12. The overhead structure 12 may be moveable. The suction head 10 is moveable within the overhead structure. The head includes elbow 14 which is connected to the inlet of fan 16 located within cotton gin building 18.

Suction pipe 20 includes inner barrel 22 which is connected to the suction head 10 structurally and to the elbow 14 pneumatically. Therefore, the suction pipe 20 is pneumatically connected to the inlet of the fan 16.

Outer barrel 24 of the suction pipe 20 telescopes over the inner barrel and depends therefrom. The outer barrel 24 is moveable up and down with respect to the inner barrel. Bell 26 is located upon the lower portion of the outer barrel 24. The bell 26 flares outward at the bottom. The bell 26 is shown to be made of sheet metal, however those having skill in the art will understand that it could be made of a flexible material. In operation, the bell is located above and near the top of a module which is mass 28 of packed seed cotton.

The suction pipe has an upper end 21 at the upper portion of inner barrel 22. Also, the suction pipe has a lower end 25 which in this instance will be the lower end of the bell 26. The lower end of the suction pipe is moveable horizontally over the top of the module.

As described to this point those with ordinary skill in the art will recognize that all of the elements to this point are old and well known to the prior art.

According to this invention, horizontal prong shaft 30 is journalled for rotation at or within the bottom or the mouth of the bell, which is also the lower end of the suction pipe 20. The shaft 30 is journalled within suitable bearings 32, one on each end of the shaft. In the event the bell is made of flexible material, the bearings 32 would be mounted upon a suitable sub-frame extending down from the bottom of the outer barrel 24 to support the prong shaft 30.

One prong shaft has been illustrated in the drawings and described in detail here, however those with ordinary skill in the art understand that in larger installations there could be a plurality of prong shafts and at least some of the prong shafts could be elevated above the lowermost prong shaft.

A series of disks or cuffs 34 are telescoped over the shaft 30 and fixed thereto. Each of the cuffs has a plurality of prongs 36 extending therefrom.

The prong shaft is located extremely low on the lower end 25 of the suction pipe 20. The prongs 36 extend below the lower end or mouth of the suction pipe 20. Therefore, it may be seen as the suction pipe is moved horizontally over the surface of the packed seed cotton 28 that the movement of the prongs will agitate the packed seed cotton below the mouth. The prongs will loosen the packed seed cotton below the mouth so that it may be more conveniently sucked into the suction pipe.

The prong shaft 30 is rotated by motor 38 which is conveniently mounted on the lower portion of the suction pipe. It is preferred that the motor 38 be mounted upon bracket 40. The motor has motor shaft 42 extending from it. The motor shaft is parallel to the prong shaft. Motor shaft wheel or sprocket 44 is mounted upon the end of the motor shaft 42. The motor is between the drive wheel and the pipe. A prong shaft sprocket (not shown) is mounted upon the end of the prong shaft 30. The two sprockets are mounted in driving relationship and are connected by chain 48. It will be understood by those skilled in the art that prong shaft 30 could be driven by any number of mechanical connections from the motor 38; for example by belts or gears, as well as a chain and sprocket drive.

The shaft 30 could be directly mounted to the motor 38. It is preferred that the motor be mounted on a bracket to prevent the projection of the motor outward from the lower end 25 of the suction pipe 20. The motor 38 could be powered by compressed air or electricity.

A larger unit is contemplated with a narrow mouth and a long mouth which would extend across the width of a module. In such a large unit, a motor might be required at each end of the mouth. Also, it might be desirable to have a plurality of prong shafts as discussed above.

A pair of hydraulic hoses 50 extend from an energy source in the form of hydraulic fluid under pressure 52 mounted upon the suction head 10. The connection from the source 52 to the motor 38 includes hose reel 54 mounted upon the suction head 10. The upper portion 56 of the hoses 50 extend from the hose reel 54 to quick connection 58 at the top of the outer barrel 24. The lower portion 60 of the hoses extend from the quick connection 58 to the motor 38. The lower portion is attached by convenient connectors 62 to the outer barrel.

Although, the lower portion 60 of the hoses 50 are referred to as hoses, it will be understood that since they are rigidly connected to the outer barrel that they could be rigid conduits rather than flexible conduits as the term hoses implies. By disconnecting the connectors 58, the outer barrel 24 may be removed and a conventional outer barrel installed as conditions may require.

Therefore, it may be seen that this invention provides a ready means to break up or disperse the packed seed cotton 28 so that it may be readily sucked by the suction pipe into the cotton gin.

The embodiment shown and described above is only exemplary. We do not claim to have invented all the parts, elements or steps described. Various modifications can be made in the construction, material, arrangement, and operation, and still be within the scope of our invention.

The restrictive description and drawings of the specific example above does not point out what an infringement of this patent would be, but is to enable one skilled in the art to make and use the invention. The limits of the invention and the bounds of the patent protection are measured by and defined in the following claims.

We claim as our invention:

1. The structure of a suction pipe for sucking packed seed cotton into a cotton gin, including, a) overhead structure having a suction head above b) a mass of packed seed cotton, c) the suction pipe having an upper end and a lower end, d) the upper end of the pipe structurally movably depending from the suction head, e) the upper end pneumatically connected through the suction head to an inlet of a fan, f) a source of hydraulic fluid under pressure on the suction head, and g) a mouth on the lower end of the pipe;
wherein the improvement comprises:
h) a horizontal prong shaft having an axis journalled to the pipe at the mouth,
i) a hydraulic motor attached to the pipe,
j) the motor drivingly connected to the prong shaft,
k) prongs mounted on the prong shaft,
l) the prongs extending below the mouth,
m) a motor shaft on said motor,
n) a drive wheel on the motor shaft,
o) said motor connected to the pipe with the motor shaft parallel to the prong shaft and the motor between the drive wheel and the pipe,
p) the motor drivingly connected to the prong shaft by the drive wheel,
q) a hose reel connected to the suction head,
r) said hose reel is connected to the source,
s) two hydraulic hoses connecting the motor to the hose reel,
t) the hoses are reeled upon the hose reel and extend to the motor.

2. The structure as defined in claim 1 wherein the suction pipe has
u) an inner barrel connected to the suction head, and
v) an outer barrel with an upper end telescoped over the inner barrel and extending to the mouth, and further comprising:
w) a portion of the hoses attached to the outer barrel from the upper end thereof to the motor, and
x) a quick connection at the upper end of the outer barrel on each hose connecting the portion attached to the outer barrel to a portion reeled upon the reel.

* * * * *